United States Patent
Bruzzone et al.

(10) Patent No.: US 11,664,878 B1
(45) Date of Patent: May 30, 2023

(54) INTERFERENCE RESISTANT METHOD FOR IN-SITU OPERATIONAL CALIBRATION AND COMPENSATION OF GAIN AND PHASE VARIATIONS IN ANTENNA ARRAY RECEIVER RF AND ANALOG FRONT-END ELECTRONICS

(71) Applicant: Tarana Wireless, Inc., Milpitas, CA (US)

(72) Inventors: Stephen P. Bruzzone, San Jose, CA (US); Eric Pierre Rebeiz, Mountain View, CA (US)

(73) Assignee: Tarana Wireless, Inc., Milpitas, CA (US)

( * ) Notice: Subject to any disclaimer, the term of this patent is extended or adjusted under 35 U.S.C. 154(b) by 0 days.

(21) Appl. No.: 17/169,933

(22) Filed: Feb. 8, 2021

Related U.S. Application Data

(63) Continuation of application No. 16/868,180, filed on May 6, 2020, now Pat. No. 10,931,362.

(51) Int. Cl.
  *H04K 1/10* (2006.01)
  *H04L 27/28* (2006.01)
  *H04B 7/08* (2006.01)

(52) U.S. Cl.
  CPC ......... *H04B 7/0865* (2013.01); *H04B 7/0831* (2013.01)

(58) Field of Classification Search
  CPC .... H04B 7/0865; H04B 7/0831; H04B 7/066; H04B 7/086; H01Q 3/2629; G01S 7/2813; G06F 17/15

USPC ....... 375/260, 346, 224, 227, 229, 231, 232, 375/233
See application file for complete search history.

(56) References Cited

U.S. PATENT DOCUMENTS

| | | | |
|---|---|---|---|
| 4,641,259 A | 2/1987 | Shan et al. | |
| 4,849,764 A | 7/1989 | Van Heyningen | |
| 7,860,183 B2 * | 12/2010 | Maltsev | H04L 25/0248 375/267 |
| 10,778,308 B1 | 9/2020 | Bruzzone et al. | |
| 10,931,362 B1 * | 2/2021 | Bruzzone | H04B 17/345 |
| 2007/0285315 A1 | 12/2007 | Davis et al. | |

(Continued)

OTHER PUBLICATIONS

U.S. Appl. No. 16/868,180, filed May 6, 2020, titled: "Interference Resistant Method for In-Situ Operational Calibration and Compensation of Gain and Phase Variations in Antenna Array Receiver RF and Analog Front-End Electronics", pp. all.

*Primary Examiner* — Phuong Phu
(74) *Attorney, Agent, or Firm* — Stoel Rives LLP

(57) ABSTRACT

Systems and methods are described for performing interference-resistant calibration and compensation of radio-frequency (RF) and analog front-end electronics of antenna-array based receivers during active operation. Examples of systems and methods are described herein that may provide interference-resistant calibration maintenance and ongoing compensation for changing gain and phase in receiver front-end electronic components, due to manufacturing tolerances and operational and environmental factors such as variations in temperature, humidity, supply voltage, component aging, connector oxidation, mechanical stresses and vibration, and/or maintenance operations such as sparing and swapping of cables, front-end electronics modules, and/or associated circuitry.

21 Claims, 6 Drawing Sheets

(56) References Cited

U.S. PATENT DOCUMENTS

2008/0291083 A1 11/2008 Chang
2011/0255612 A1* 10/2011 Bernstein ........... H03M 13/1111
375/259

* cited by examiner

INTERFERENCE RESISTANT METHOD FOR IN-SITU OPERATIONAL CALIBRATION AND COMPENSATION OF GAIN AND PHASE VARIATIONS IN ANTENNA ARRAY RECEIVER RF AND ANALOG FRONT-END ELECTRONICS

CROSS-REFERENCE TO RELATED APPLICATION(S)

This application is a continuation of U.S. patent application Ser. No. 16/868,180 filed May 6, 2020, issued as U.S. Pat. No. 10,931,362 on Feb. 23, 2021. The aforementioned application is incorporated herein by reference, in its entirety, for any purpose.

TECHNICAL FIELD

Examples described herein relate to wireless communication systems. Example systems and methods are described for performing interference-resistant calibration and compensation of radio-frequency (RF) and analog front-end electronics of antenna-array based receivers during active operation. Examples of systems and methods are described herein that may provide interference-resistant calibration maintenance and ongoing compensation for changing gain and phase in receiver front-end electronic components, due, for example, to manufacturing tolerances and operational and environmental factors such as variations in temperature, humidity, supply voltage, component aging, connector oxidation, mechanical stresses and vibration, and/or maintenance operations such as sparing and swapping of cables, front-end electronics modules, and/or associated circuitry.

BACKGROUND

Radio receivers utilizing multi-antenna radio architectures, e.g., antenna arrays, are employed in a growing diversity of government and commercial enterprises. A typical architecture includes a plurality of antennas mounted to an antenna-array platform or housing, with physical separations between antennas ranging from nominally one-third to several wavelengths for an intended radio band. Each antenna is connected to an individual member of a bank of radio receivers, each of which normally comprises a bandpass filter, a low-noise amplifier (LNA) stage, a tuner stage including a mixer or mixers (e.g., quadrature mixers) to accomplish down-conversion to baseband, and a digitizer stage (analog-to-digital converter, ADC). As a rule most or all tuners are tuned to a common RF center frequency in an operating band of interest. Applications for such multi-antenna architectures include radio direction-finding (DF), and spatially enhanced radio communication systems and networks. Examples of radio DF applications include maritime and commercial navigation, radio spectrum enforcement by locating interference sources (e.g., pirate radio stations), and military threat assessment, targeting and interdiction. Examples of spatially enhanced radio communications include Wi-Fi gear and networks, and nascent array-based broadband wireless internet systems and networks, e.g., wide-area networks (WANs). Particularly relevant among the latter are emerging wireless technologies that use the spatial diversity afforded by antenna arrays which facilitate capacity multiplication and/or cell densification through extensive frequency reuse, as well as the ability to operate through unregulated interference in unlicensed bands. These spatially enhanced wireless systems and methods are referred to variously as adaptive arrays, beamforming, multiple-input-multiple-output (MIMO) spatial multiplexing, and space-time-adaptive processing (STAP) beamforming, as a partial list.

Receiver calibration methods are required in many such multi-antenna radio architecture applications. For example, systems performing radio DF rely on the maintained accuracy of an array DF manifold, which is obtained initially by recording the antenna array response versus angle-of-arrival (AOA) while a DF calibration radio emitter is swept in AOA. This is usually accomplished by choosing one antenna at the array-based receiver to serve as a reference element, and computing the differential amplitude and phase response of each of the other antennas relative to this reference at each step in the AOA sweep. The resulting multi-antenna gain and phase vector function versus AOA is referred to as the array DF manifold, which is stored and used subsequently for AOA estimation using various DF algorithms that find extrema (received energy peaks or nulls) corresponding to received RF emitter AOAs on the receiver array. Obtaining an array DF manifold is generally a labor and time intensive procedure that takes the DF system out of service and may involve costly calibration flights if the DF system is an airborne asset. Yet the DF manifold is subject to drift with temperature, component aging, and other environmental and operational factors, and can be altered considerably by routine maintenance such as replacement of coaxial cables in the receiver RF front-end. Accordingly, ongoing front-end receiver calibration/compensation maintenance methods would help to maintain the accuracy of the array DF manifold, and hence the accuracy of AOA estimates, through these unintentional variations in gain and phase in the receiver RF and analog front-end electronics.

Among spatially enhanced wireless communication data links and networks, RF front-end calibration maintenance is particularly critical in emerging antenna array technologies that employ retro-directive transmit and receive functions. These are typically implemented using time-division duplex (TDD) protocols that alternately transmit and receive on a common radio frequency in a rapidly alternating, periodic frame structure. During the receive portion of the frame, termed the receive sub-frame, each link end adapts a STAP beamformer to serve as a spatial filter, e.g., an antenna array adaptive beamformer, to form a spatial response pattern that explicitly attenuates interfering signals while maximizing receiver array gain on the desired signal, that being the signal transmitted by the opposite end of the link. In a retro-directive system each link end then turns around and uses its latest receive beamformer as a retro-directive transmit beamformer during the subsequent transmit sub-frame. Such reciprocal use of the beamformer produces an interference-minimizing transmission that focuses maximum radiation on the intended receiving end and away from unintended nodes, in exact proportion to the foregoing receive spatial response pattern. This precise control of radiation patterns allows retro-directive networks to achieve higher levels of spectral efficiency than common networks such as prevailing cellular and wireless internet networks, achieving greater network densities and more users per unit area in a given bandwidth. However, these benefits depend on channel reciprocity, which is dictated by the degree to which receive and transmit spatial response patterns are matching. In an ideal retro-directive transceiver these would be identical, but in practice TDD transceivers have a switching front-end that alternates between relatively high-power transmit front-end circuitry during the transmit sub-frame, and low-power/high-sensitivity receive front-end circuitry during the receive sub-frame. Gain and phase differences can be substantial in these disparate circuit elements and can damage or entirely destroy radiation pattern reciprocity if measures are not taken to track and compensate (remove) such differences.

In some examples variously termed multi-stream links or MIMO links, a link may employ multiple such signals (called streams) in each direction; for example, a MIMO-2 link would employ two streams in each direction. Such arrangements may utilize antenna arrays to exploit channel multipath and/or antenna polarization diversity to achieve a payload capacity multiplier, for example by a factor of two in the case of the aforementioned MIMO-2 link type. In such instances the multiple streams in a link form independent signals that may be separated via separate STAP beamformer solutions along the lines described above. In this type of link, each such STAP beamformer solution may treat the other co-link stream(s) each as another interferer, e.g., each as one more source of interference to be nulled along with all other interferers in the channel. Alternatively, nonlinear STAP methods may be used to perform joint demodulation of multiple such MIMO streams per link, in which case there is no increase in the effective number of interferers present. In either case, retro-directive systems employing multi-stream links have spectral efficiency benefits at least equal to those employing single-stream links, and also have similar channel reciprocity requirements.

Channel reciprocity is maintained in a retro-directive communication transceiver by calibrating and removing gain and phase differences between transmit and receive RF analog signal paths, which the transceiver selects alternately through a transmit/receive (T/R) switch as part of normal operation in each TDD frame. For this purpose RF calibration couplers are placed at the system periphery, one on each antenna path (denoting such a bidirectional signal path for each antenna), as near the antennas as possible (e.g., near each antenna jack on the chassis), to sample transmitted calibration waveforms during transmit path calibration, and to inject receiver calibration waveforms during receive path calibration. By this arrangement an alternating transmit/receive calibration procedure is then able to include all front-end electronics including the T/R switch, which can itself be asymmetric in gain and phase (complex gain) between transmit and receive selections. Transmitter and receiver calibration signals are typically injected periodically as short burst waveforms, at intervals frequent enough to keep up with front-end gain and phase changes and also support calibration waveform integration across multiple such calibration signal injections for SNR enhancement purposes. In retro-directive TDD systems these signal injections will generally be synchronous with the TDD frame, but not necessarily repeated on every frame. Antennas remain connected throughout this procedure to ensure an in-situ calibration that accurately accounts for their impedance-matching and transmission line termination effects as an integral and operational part of the front-end electronics. The receive-to-transmit ratio of the complex gains thus measured in each antenna path may then be applied to each such path during transmit to maintain transmit-receive reciprocity, and hence channel reciprocity. Or equivalently, the receive and transmit paths may each be pre-multiplied by the reciprocal of its respective measured gain and phase to achieve an effective unit response in both directions, thereby maintaining channel reciprocity.

When both transmitter and receiver calibration is required, such as in retro-directive systems, the complex gain measurement accuracy requirements for each are as a rule similar, because their overall accuracy for restoring channel reciprocity is dictated to by the sum of the two associated measurement errors. Hence also as a general rule, their key signal injection parameters and requirements tend to be similar, such as calibration signal spectral purity (e.g., whiteness), their signal-to-noise ratio (SNR), duration, injection period, and amount of averaging over injections (time). As well, both must be calibrated across their respective normal operating transmitter power and receiver gain ranges. However, they are highly dissimilar in regard to interference conditions. Transmitter calibration, even at its lowest power level, is naturally immune to signals in the local environment by virtue of its direct excitation of each antenna at normal transmitter power levels, hence achieving an extremely high calibration signal-to-interference ratio (SIR) into the calibration couplers. Receiver calibration, on the other hand, should be performed at normal receiver operating gain levels, the latter designed to amplify signals anywhere within the antenna array radio horizon and provide them to the digitizer with SNR preserved, and scaled within the supported digitizer dynamic range. The receiver calibration signal must therefore be injected through the calibration couplers at levels similar to the local received signals, in order to avoid amplifier saturation and overload, and digitizer clipping. As a result, the receiver calibration signal may often be present at power levels on a par with significant numbers of interfering signals, representing calibration signal SIR levels that may drop as low as 0 dB and lower.

Accordingly, unless provisions are made to guarantee radio silence of most or all significant emitters within the radio horizon during receiver calibration time-intervals, a difficult proposition in many operational scenarios, ongoing receiver calibration will typically benefit from, if not require, new methods for calibration through interference in order to succeed.

DETAILED DESCRIPTION

Figure 1:
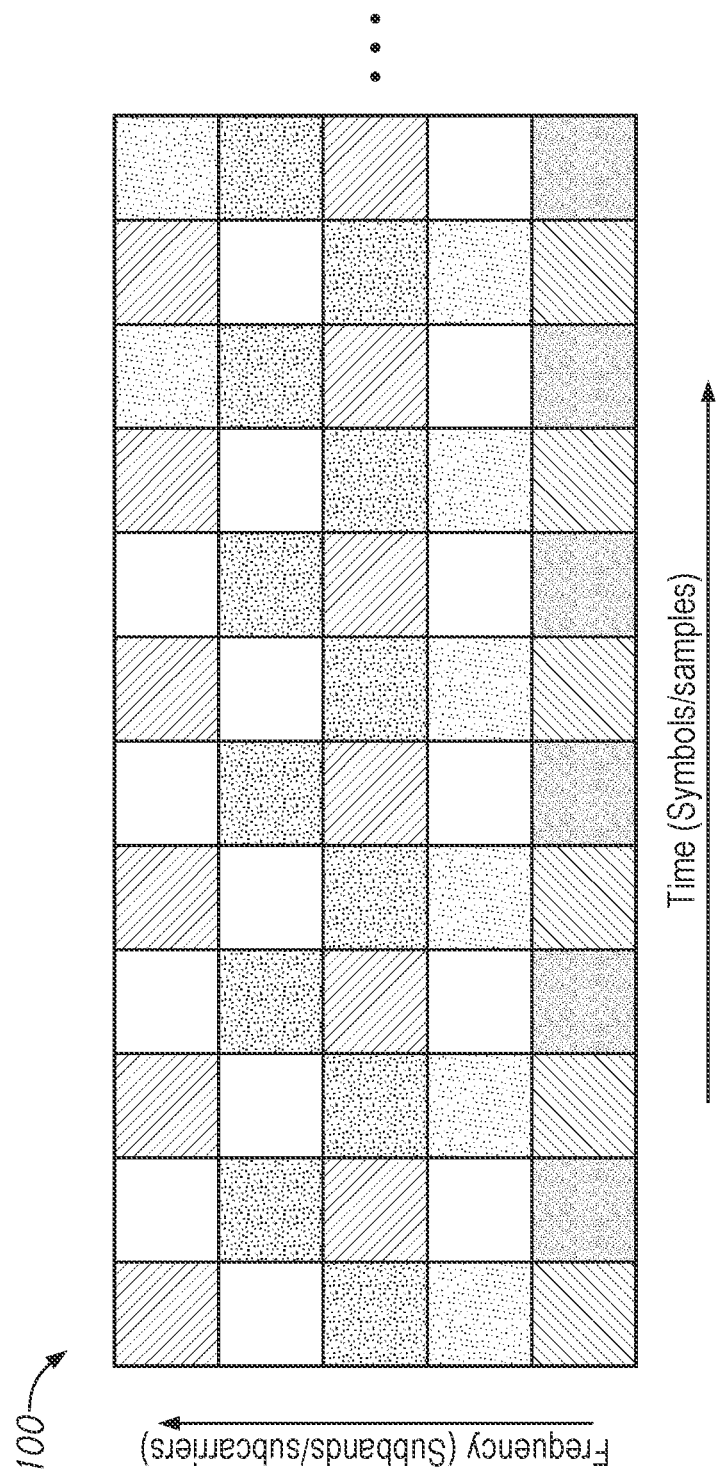
FIG. 1 is a schematic illustration of subcarriers and symbols arranged in accordance with examples described herein.

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Interference-mitigating calibration methods are discussed herein in the context of a growing class of retro-directive wireless networks (e.g., wireless WANs) employing receive-then-transmit STAP beamformers. This technology is gaining adoption, for example in the residential broadband wireless internet market, as a mechanism to provide extensive frequency reuse to the point of dense in-cell spectrum sharing, supporting multiple point-to-multipoint (PtMP) links in a single cell or sector using the same radio frequencies, without experiencing significant interference among the co-channel links. STAP beamformers accomplish this interference mitigation by forming spatial response-pattern dips, called spatial nulls, in the directions-of-arrival of interfering rays arriving at the receiving antenna array. As a result, retro-directive systems, as well as other system types employing STAP beamforming, are highly tolerant to most forms of radio interference including unregulated and often chaotic radio emissions occurring in unlicensed bands. Rightly, these retro-directive systems are now fueling a migration of wireless network services into previously unworkable and very economical unlicensed bands.

A wide range of antenna element types and array constructions may be employed by retrodirective systems. Each antenna element may have a single polarization, or alternatively two feed points that are orthogonally (or quasi-orthogonally) polarized. For example, the orthogonal (or quasi-orthogonal) feed points may be vertical and horizontal polarizations, left-hand-circular and right-hand-circular polarizations, or slant-left and slant-right polarization as examples. Such dual-polarization elements yield independent data streams despite their common physical location on the array, and hence represent two distinct antenna paths for calibration and channel reciprocity purposes. In some examples, an array may include strictly single-polarization antennas, all of one polarization type, or of mixed polarization types. Each antenna may be passive or active. The antennas can be arrayed in a linear array, a two dimensional array or a 3-dimensional array, or in any other arrangement.

STAP beamforming is applied to received antenna array data streams after the latter have been down-converted to baseband and digitized as complex baseband data streams. The STAP beamformer may be viewed as compartmentalized into a weight calculator and a linear combiner. The STAP beamformer weights, as generated by the weight calculator, are applied to the linear combiner, which combines signals as received on the various elements of an antenna array to achieve spatial selectivity. Spatial selectivity is used to enhance the detection and extraction of signals from complex RF environments, to enhance the signal to interference plus noise ratio (SINR), to overcome multipath distortion, and/or to remove detrimental interference via interference cancellation (IC). Subsequently, the same STAP beamformer weights are used in retro-directive systems to transmit during the transmit sub-frame of the TDD frame, which follows the receive sub-frame. The weights may be derived and/or adapted by a variety of methods.

In theory the number of interfering signals that can be nulled by a STAP beamformer increases with the number of antennas. However, the amount of training data and related processing used to adapt the beamformer also grows with the number of antennas. As a rule, the training time-bandwidth product (TBP) of an adaptive beamformer, expressed as a number of independent training samples, should theoretically be at least 4N samples for an N-element antenna array. This is sometimes referred to as the "4N rule." Because these training samples displace valuable payload data and reduce the effective data (e.g., payload) throughput of the system, the number of antennas employed in retro-directive system arrays tends to be limited to not more than two to three dozen., although other numbers are possible.

Like other modern wireless systems (e.g. Wi-Fi, WIMAX, LTE, 5G-NR), retro-directive systems of interest to this discussion have adopted a form of data modulation termed orthogonal frequency division multiplexing (OFDM) and/or OFDM multiple-access (OFDMA). Under these OFDM formats the frequency domain is divided into a set of equally spaced subcarriers, and the time domain is divided into equally spaced symbols. FIG. 1 illustrates subbands (groups of consecutive subcarriers) and symbols in accordance with examples described herein. The y-axis represents frequency, while the x-axis represents time. The frequency domain (e.g., y-axis) in FIG. 1 is shown divided into five subbands, although any number may be used. Each subband contains a specified number of subcarriers, not shown, corresponding to the bins of an OFDM Fast Fourier Transform (FFT) residing within that subband. OFDM systems use subbands in multiple access networks to define a minimum frequency allocation unit, whereby users share network bandwidth in accordance with their instantaneous data demands, contracted service levels, etc. The time domain (e.g., x-axis) is divided into FFT data blocks, referred to herein as OFDM symbols. Twelve OFDM symbols are shown in FIG. 1, although any number may be used within the same or a different amount of time by resizing the FFT as needed. A variety of OFDM symbol types may be used, e.g., wherein some OFDM symbols may carry payload data, some may carry control channel data, some may carry system broadcast channels, some may carry STAP beamforming training data, and some may carry sounding data used for system calibration, as discussed herein, and/or for channel sounding, as used by some MIMO links to support multiple MIMO data streams. Under OFDM, data are transmitted on each subcarrier in each symbol, typically as quadrature amplitude modulated (QAM) constellation samples. In addition, a subset of subcarriers may be designated as non-payload pilot symbols, which may be used to provide amplitude and/or phase reference.

Figure 2:
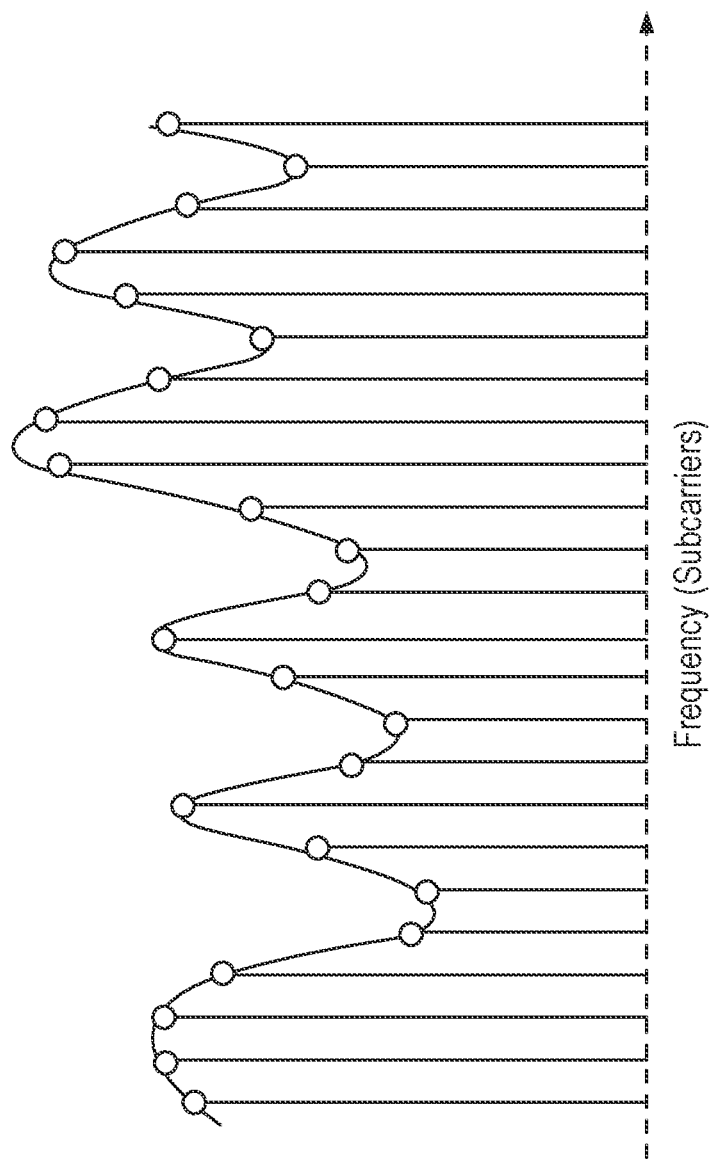
FIG. 2 is an example waveform, in the frequency domain, with illustrative subcarriers in accordance with examples described herein.

The optimum STAP beamformer weights are a function of the channel response(s) of all signals arriving at the array, which in turn is a function of the environment. If the propagation channel varies rapidly in both time and frequency domains, then the optimal solution will also vary rapidly in both domains. Variation in the frequency domain is a consequence of multipath (e.g., the signal bouncing among different objects in the environment) leading to different copies (e.g., multipath rays) of the same signal arriving at the destination at different time delays. The relative delay between the different copies arriving at the receiver/destination creates variations in the frequency response of the propagation channel. The larger the delay spread among the different paths traversed by the signal, the more rapid the variation in the frequency domain (see FIG. 2). FIG. 2 is a schematic illustration of examples of propagation channel frequency responses arranged in accordance with examples described herein. FIG. 2 includes frequency along the x-axis (e.g., multiple subcarrier frequencies are shown).

To deal with this issue, the frequency band of interest may be broken into smaller beamforming subbands as shown in FIG. 3A-D. A STAP beamformer is then generated over each subband independently. The subband is down-sized from the full system bandwidth to provide optimal or near optimal STAP beamformer performance at each frequency domain subcarrier in each time-domain OFDM symbol. This per-subband beamforming strategy is well-suited to OFDM modulation formats, particularly if beamforming subbands are designed to coincide with the minimum frequency allocation unit subbands, or to fit within the latter in integer quantities. If a single subband does not contain enough subcarriers (e.g., training samples) to meet beamformer training TBP requirements, multiple OFDM symbols may be used for beamformer training to supply the needed multiplicity of subband subcarriers.

Figure 3A:
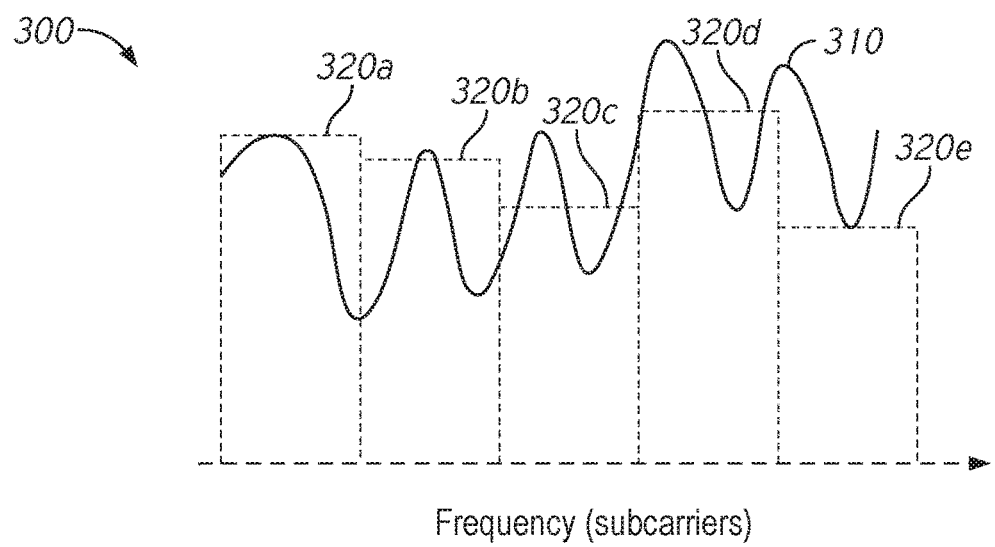
FIG. 3 A-D illustrate example waveforms, in the frequency domain, with corresponding illustrative STAP solutions.
Figure 3B:
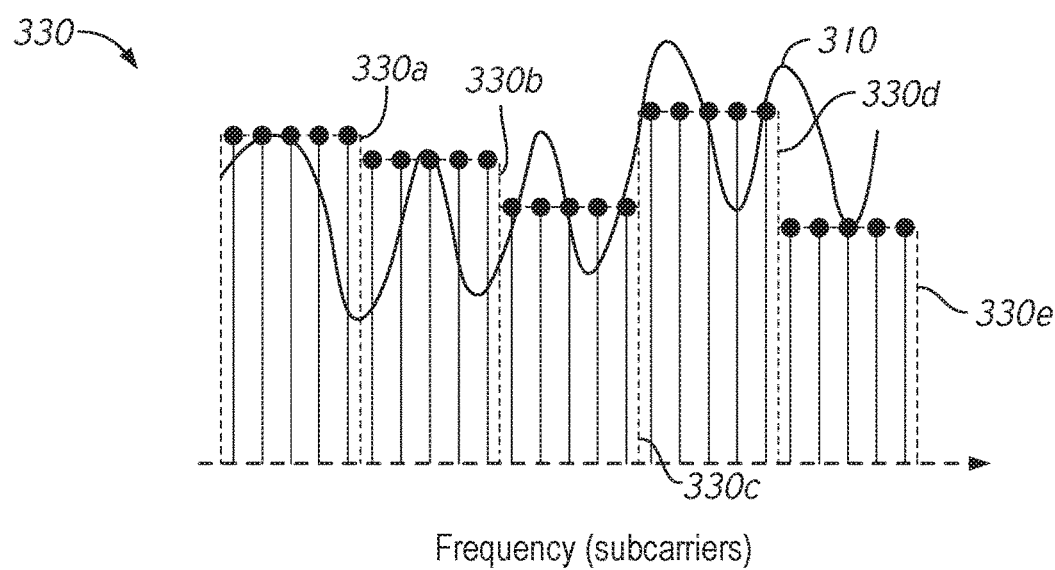
Figure 3C:
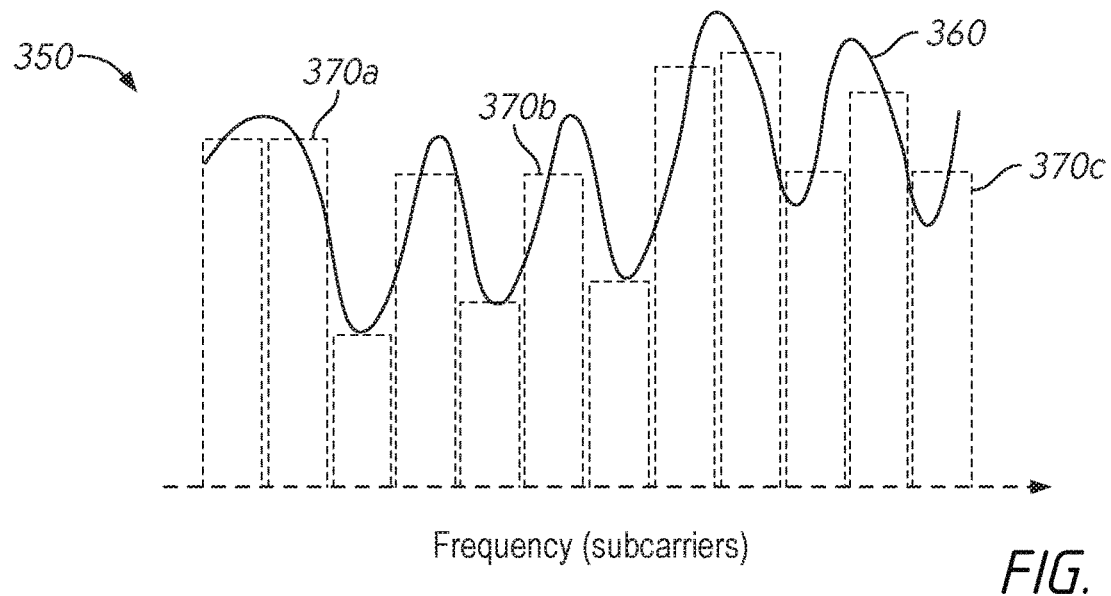
Figure 3D:
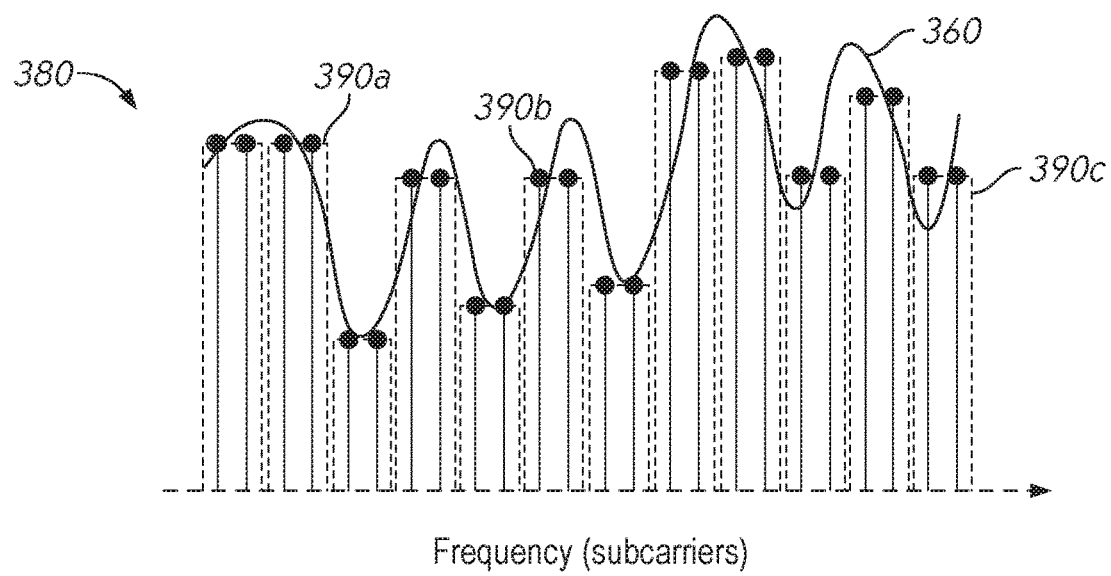

FIG. 3A-3D illustrate solutions (e.g., weights) that are calculated at a single moment in time (e.g., for one OFDM symbol) for subbands in the frequency domain. FIG. 3A depicts a curve 310 representing a frequency-varying optimal or goal solution, superimposed on multiple subbands—e.g., subbands 320a-e as shown. These subbands are shown as equal in width, although unequal subbands may be used in other examples. In FIG. 3B, a single solution is shown in each subband as a dark dot applied to all subcarrers within the subband, where the individual subcarriers are shown as vertical lines. Looking in detail at subband 320a, for example, a solution corresponding to a "maximum" of the optimal solution 310 in the subband 320a may be used on each of the five subcarriers in subband 330a. The vertical distances between the dots in subband 330a and the optimal solution curve 310 are visual indicators of each subcarrier's performance shortfall from the optimal solution, illustrating that shortfalls can be significant, particularly at subband edges, for the rate of frequency variation shown. FIGS. 3C and 3D are analogous to FIGS. 3A and 3B, but using narrower subbands. In the example of FIG. 3C, the frequency range shown is divided into 12 subbands. In FIG. 3D, two subcarriers are illustrated in each subband, and a same solution (e.g., weights) may be used for each of the two subcarriers in the subband. Note that the solutions shown in FIGS. 3C and 3D may be closer to the optimal solution 310, with smaller performance shortfalls than in FIGS. 3A and 3B where a wider subband was used.

Similarly, the frequency response of receiver front-end RF and analog electronics may vary as a function of frequency (as well as in time), although not as rapidly or widely in general as typical propagation channels. Accordingly, the subband partitioning used for STAP beamforming may also be used for front-end calibration to compensate the comparatively more gradual receiver front-end gain and phase variations. This may bring simplifying advantages for implementation, integration, and testing by allowing the use of a common subband indexing scheme for both.

While the interference immunity of retro-directive systems may be one of their key benefits, it creates a receiver calibration maintenance challenge as the injected calibration signals must compete with that interference, particularly in unlicensed bands. Accordingly there is a need for interference-mitigating receiver calibration methods. An interference-mitigating receiver calibration method as described herein calibrates subsets of $N_{cal}$ antenna paths at a time (e.g., $N_{cal}=3$ antenna paths), while using $N_{canc}$ complementary antennas (e.g., $N_{canc}=4$ antenna paths) to provide samples of the interference as received on the array to a pre-canceller stage that reduces (e.g., cancels) that interference from the former calibration subset prior to the calibration step, where $$N_{cal}+N_{canc} \leq N_{ants}, \quad (1)$$

and where $N_{ants}$ is the number of antennas on the antenna array. In general these antenna subsets should be mutually exclusive but may otherwise be selected arbitrarily without regard to their relative locations on the array. The terminology antenna path generally refers to the entire chain of RF and analog circuitry for which calibration will be provided, for example, starting from the chassis antenna jack and ending after the digitizer stage, and including usually a T/R switch, a bandpass filtering stage, an LNA stage, a tuner stage to accomplish down-conversion to baseband, and a digitizer stage, as well as any additional RF and/or analog circuitry that reside between antenna and digitizer. The calibration subsets can range from a single antenna path at a time (e.g., $N_{cal}=1$), to calibrating nearly all antenna paths at a time. The choice is governed by the number of interference sources anticipated, versus the calibration time latency that can be tolerated. The former may be the dominant consideration, as a failure to allocate enough antennas for interference cancellation may impose lower interference handling limits on calibration than needed in some operational scenarios. For example, a typical retro-directive system may employ a number of antenna elements $N_{ants}$ equal to nominally twice the number of interfering signals anticipated, where the interfering signal count includes the desired signal or signals (since all signals reaching the array are mutually interfering with one-another). This array sizing is dictated by the fact that an antenna array can handle (e.g., support beamformer mitigation or cancelation of) at most $(N_{ants}-1)$ interfering signals in multipath-free conditions, or down to as low as half that number in heavily dispersive multipath environments. The use of reduced-bandwidth subbands reduces the effective amount of multipath dispersion via a reduction in time resolution, such that rays arriving at slightly different times may coalesce into a single composite effective ray. As a result, subband beamforming may be used to restore much of the $(N_{ants}-1)$ interference handling upper bound in multipath environments. In addition, the controlled absence of desired (managed network) signals during receiver calibration time-intervals yields a calibration interference budget that is reduced by at least the number of desired signals at a given node, hence reducing the number of antennas needed to represent, and cancel, the remaining unmanaged interfering signals at that node. Since the arrays of a given communication system have been sized for the operational interference-plus-desired signals environment, interference-mitigating calibration may be expected to work with an interference pre-canceller that uses a subset of the full set of array antennas to cancel the non-system (unmanaged) interference that remains during calibration injections.

While $N_{canc}$ should be made as large as possible to handle the largest possible number of unmanaged interferers, there are offsetting advantages to keeping $N_{canc}$ significantly smaller than $N_{ants}$, as that will allow $N_{cal}$ to be increased which in turn reduces the time required to update the calibration of all antenna paths. In general, a calibration update of the full array requires $N_{calCycles}=\lceil N_{ants}/N_{cal} \rceil$ calibration sounding (signal injection) cycles, where $N_{cal}$ antenna paths are sounded at a time, and $\lceil x \rceil$ signifies rounding up to the nearest integer. As used herein the terms "calibration sounding" and "calibration signal injection" are synonymous. Using an increased value for $N_{cal}$ causes a reduction in $N_{calCycles}$, yielding reduced calibration latency and hence improved calibration agility and accuracy.

An example embodiment of a receiver front-end calibration algorithm for an array-based OFDM system with $N_{ants}$ antennas and subbands of size $N_{subcarriers}$ subcarriers each is now described in detail. The general procedure is to obtain ongoing receiver calibration snapshots over which averaging is performed to yield a running estimate of the gain and phase variations in each antenna path of the receiver front-end. The reason for using averaging over multiple snapshots is to accomplish noise reduction via integration across the set of snapshots. Each subband is calibrated separately and independently, but preferably simultaneously with the others on a common calibration-set schedule in order to expedite full-band calibration and simplify system tasking and control, although this is not a requirement for the algorithms described herein. A calibration snapshot may refer to a single data segment containing the injected calibration signal burst in one subband and one TDD frame. Not all TDD frames will necessarily contain calibration snapshots, so a calibration set of K snapshots may span more than K TDD frames.

The calibration snapshot may be embedded within one or more OFDM symbols. For example, M OFDM symbols may be used to meet the $4N_{canc}$ TBP training rule (for interference cancellation within the calibration algorithm), providing a calibration snapshot size of $N_{snapshot}=M \times N_{subcarriers}$ samples. Conversely, in another system the embedded calibration signal burst may occupy just a fraction of an OFDM symbol, e.g., one-half of an OFDM symbol, for example in order to fit within the host system TDD frame structure, or for other reasons. The example embodiment described herein assumes the calibration burst fits within a single OFDM symbol, e.g., $N_{snapshot}=N_{subcarriers}$, and hence constitutes an OFDM calibration symbol.

Figure 4:
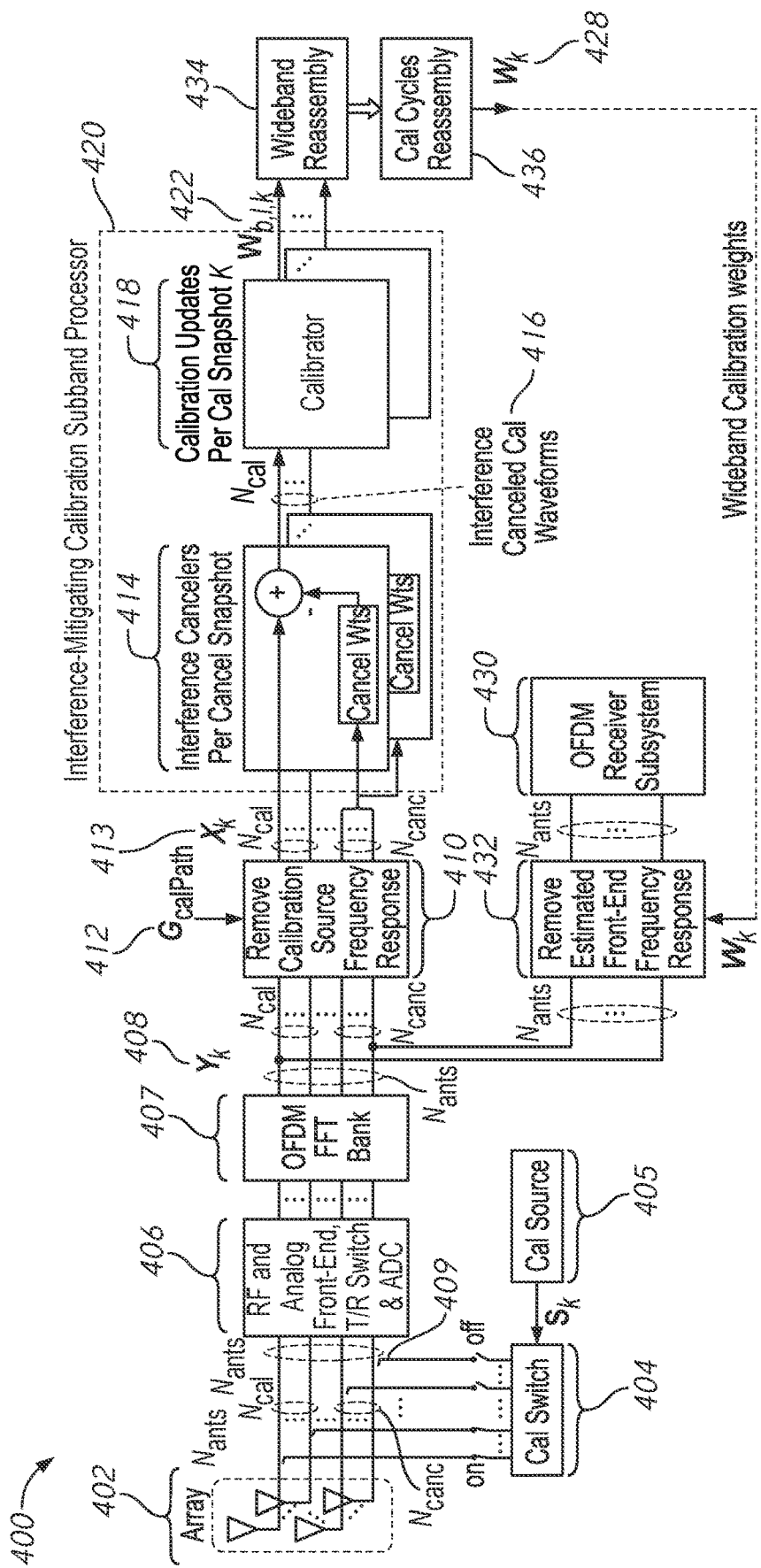
FIG. 4 is a schematic illustration of a system arranged in accordance with examples described herein for interference-mitigating receiver calibration.

A block diagram of an example embodiment of a receiver which may implement an interference-mitigating receiver calibration method is shown in FIG. 4. The antenna array 402, having $N_{ants}$ antennas, is connected to the receiver system RF front-end including analog electronics and digitizer 406, representing the entire chain of receiver RF and analog circuitry for which calibration will be provided. For example the analog electronics and digitizer 406 may start from the chassis antenna jack and end after the digitizer stage, and include a TDD T/R switch, a bandpass filtering stage, an LNA stage, a tuner stage to accomplish downconversion to baseband, and a digitizer stage, as well as any additional RF and/or analog wiring or circuitry that may reside between antenna and digitizer. Calibration injection couplers 409 are positioned near the antenna in each antenna path. The calibration switch 404 is shown closed on $N_{cal}$ antenna paths, and open on $N_{canc}$ antenna paths, the former corresponding to the $N_{cal}$ antenna paths under calibration in the current calibration cycle. Through these switches the wideband calibration signal S 405 is injected through the couplers 409 into the $N_{cal}$ antenna paths during the calibration symbol in the TDD frame. The calibration switch is controlled by calibration automation software hosted in the system controller, residing in e.g. one or more digital signal processors (DSP), a central processing unit (CPU), and/or other software or firmware processing circuitry). The digitizer stage (the final stage internal to analog electronics 406) generates $N_{ants}$ baseband digital data streams and provides them to the OFDM FFT bank 407, which converts each data stream into the frequency domain, in the form of OFDM symbols with subcarriers spanning the full system bandwidth. These $N_{ants}$ frequency domain data streams serve as common raw data input for the Interference-mitigating calibration processor 420 and the OFDM receiver subsystem 430 supported by the former. During calibration symbols these are denoted as wideband data matrix $Y_k$ 408, which serves as input data for calibration snapshot k processing.

Prior to receiver calibration processing 420, a wideband frequency response of the calibration source, $G_{calPath}$ 412, may be known (e.g., may be captured in advance prior to operation of the receiver). The known wideband frequency response of the calibration source may be removed from the wideband OFDM FFT output $Y_k$ 408 by the divider 410 (e.g., using Hadamard division across subcarriers), providing wideband calibration processing input $X_k$ 413 at an output of the divider 410. The divider 410 may be implemented using programmable computing hardware (e.g., FPGA or ASIC processors) and/or one or more digital signal processors implementing executable instructions for division (e.g., using software). This yields an effectively white calibration source, that is, one with a flat spectrum having minimal amplitude or phase variation across the operating bandwidth. Alternatively $G_{calPath}$ may be incorporated into the calibration equations instead (e.g., the divider 410 may not be used in some examples); it is shown removed at this stage in order to reduce the baggage in upcoming descriptions.

The interference-mitigating calibration processor 420 may execute separately and independently on each subband of each of the $N_{cal}$ antenna paths. The interference canceller 414 reduces (e.g., cancels) interference in each calibration symbol from each of the $N_{cal}$ current-cycle sounded antenna paths, using data containing the interference as received on the $N_{canc}$ cancellation antennas. The $N_{cal}$ interference-cancelled data streams 416 are then presented to the calibration processor 418 that performs ongoing integration across calibration symbols, to produce accurate snapshot k calibration weights $W_{b,l,k}$ 422 for each subband b and sounded antenna path l. At the end of each snapshot and calibration cycle, all such $W_{b,l,k}$ calibration weights 422 may be incorporated into wideband calibration weights array $W_k$ 428 for the $N_{cal}$ antenna paths just completed, shown in FIG. 4 as wideband reassembly 434 across all subbands b, and calibration cycle reassembly 436 of the $N_{cal}$ updated antenna paths. The interference-mitigating calibration processor 420 may be implemented using programmable computing hardware (e.g., FPGA or ASIC processors) and/or one or more digital signal processors implementing executable instructions (e.g., using software).

The latest version of the full calibration weight set $W_k$ 428 is applied to the OFDM FFT output $Y_k$ 408 via element-by-element multiplication across subcarriers and antenna paths on each calibration snapshot k, to remove the measured antenna path amplitude and phase variations prior to entering the OFDM receiver subsystem 430. Because typical receiver front-end gain and phase frequency responses change relatively slowly versus time, significant latitude may be allowed in the schedule and manner in which the $W_{b,l,k}$ calibration weights 422 are incorporated into the wideband full-array calibration weights $W_k$ 428 in most applications, without incurring undue performance losses. For example, each subband b of each antenna path l may be updated as soon as the results become available for the current snapshot k, or a wideband update to antenna path l may be made when all subband results become available for snapshot k, or the update to $W_k$ may be held off until the end of the current $N_{cal}$-path calibration cycle, or finally the update to $W_k$ may be held off until the entire array of $N_{ants}$ antenna paths has undergone a complete wideband update. Other approaches may be used in other applications.

For each subband and antenna path in a given calibration cycle, interference-mitigating receiver calibration processing may proceed as follows. To simplify notation, the subband index b and antenna path index l are omitted going forward. As well, it is assumed that the gains and phases of all antenna path couplers 409 have been measured and factory-programmed into processing software such that the injected calibration signal appears in all digitized antenna paths at a common amplitude and phase (a common factory preset process). The received frequency-domain subband data $Y_k$ 408 during receive calibration snapshots is given by $$Y_k = \qquad (2)$$

$$\left[\left([s_k \otimes g_{calPath}]a_{calSwitch}^T + \sum_{i=1}^{N_i} p_{i,k}v_{i,k}a_{i,k}^T\right) \otimes G_{rxPath,k} + N_k\right] \otimes W_{rxCal,k}$$

where $Y_k$ ($N_{subcarriers} \times N_{ants}$) is the subband complex baseband data matrix for calibration snapshot k, "$\otimes$" denotes element-wise multiplication (e.g., the Hadamard product), $s_k$ is an $N_{subcarriers} \times 1$ constant-modulus complex vector including the subband calibration sequence, where by constant modulus is meant that the complex magnitudes of all elements of $s_k$ are equal to a common value $|s|$, such that $$s_k \otimes s_k^* = |s|^2 \times 1_{N_{subcarriers} \times 1}, \qquad (3)$$

$g_{calPath}$ is an $N_{subcarriers} \times 1$ complex vector representing the frequency response of the calibration path (e.g., from the calibration signal source to the antenna circuit coupler) which is common to all antenna paths and assumed to be known, $g_{calSwitch}$ is an $N_{ants} \times 1$ calibration injection aperture vector with ones in positions corresponding to the $N_{cal}$ antenna paths being injected for calibration and zeros in all other positions, $N_i$ is the total effective number of interfering signals in the subband that can occur in a given snapshot (for example, an interferer having two resolvable multipath rays in the subband would count as two interferers), $p_{i,k}$ is a Boolean random variable for the $i^{th}$ interferer toggling between the two values 1 and 0 corresponding to burst interferers turning on and off from snapshot to snapshot, $v_{i,k}$ is an $N_{subcarriers} \times 1$ complex random vector of the $i^{th}$ interfering signal waveform on the $k^{th}$ snapshot, $a_{i,k}$ is an $N_{ants} \times 1$ complex random vector representing the $i^{th}$ interfering signal aperture vector (including amplitude scaling) on the $k^{th}$ snapshot, and where $N_k$ is an additive noise matrix of $N_{subcarriers} \times N_{ants}$ complex samples for the $k^{th}$ snapshot. ($N_k$ is a catch-all noise term broadly representing an aggregation of receiver front-end and LNA noise sources, which are colored by the analog front-end gain and phase variations, and ADC noise which is not.) Complex matrix $G_{rxPath,k}$ ($N_{subcarriers} \times N_{ants}$) contains the frequency responses of all antenna paths in the subband, defined as $$G_{rxPath,k} = [g_{rxPath,1} g_{rxPath,2} \cdots g_{rxPath,N_{ants}}]_k \qquad (4)$$

where vector $[g_{rxPath,l}]_k$ ($N_{subcarriers} \times 1$) represents the frequency response of antenna path l on snapshot k. Finally, complex matrix $W_{rxCal,k}$ ($N_{subcarriers} \times N_{ants}$) is the sought-after subband equalization matrix, complementary to $G_{rxPath,k}$, containing the receive calibration weights whose purpose is to nullify the latter, producing as a goal an all-ones composite set of equalized antenna paths $G_{rxPath,k} \otimes W_{rxCal,k} = 1_{N_{subcarriers} \times N_{ants}}$.

Equation (2) can be simplified without loss of generality, by assuming that interferers are toggled on and off directly by either $a_{i,k}$ or $v_{i,k}$ (by toggling either to zero-vectors when needed to represent the off state $p_{i,k}=0$), and also by assuming that the calibration path subband frequency response $g_{calPath}$ has been measured (e.g., at the factory) and removed in advance from all antenna paths via element-wise division of each column of $Y_k$ by the corresponding elements of $g_{calPath}$. FIG. 4 depicts this calibration path frequency response removal using divider 410 (however, other wideband operations may be used) across all subbands, using composite vector $G_{calPath}$ 412 defined as a wideband concatenation of all such calibration path subband frequency response vectors $g_{calPath}$ as $$G_{calPath} = [g_{calPath,1}^T g_{calPath,2}^T \cdots g_{calPath,N_{subbands}}^T]^T, \qquad (5)$$

where $N_{subbands}$ is the number of subbands spanning the full system bandwidth.

This source pre-whitening allows the substitution $g_{calPath} = [1]_{N_{subcarriers} \times 1}$ into (2), in which case the calibration-path equalized subband data matrix $X_k$ 413 derived from the former $Y_k$ can be stated more compactly as $$X_k = \left[\left(s_k a_{calSwitch}^T + \sum_{i=1}^{N_i} v_{i,k} a_{i,k}^T\right) \otimes G_{rxPath,k} + N_k\right] \otimes W_{rxCal,k} \qquad (6)$$

where interference waveform vector $v_{i,k}$ and noise matrix $N_k$ have been redefined to subsume the $g_{calPath}$ normalization into their random waveform definitions. Similarly, $N_k$ can be further redefined to subsume $W_{rxCal,k}$ into its random construct, and the terms $v_{i,k} a_{i,k}^T$ can be further redefined to subsume $G_{rxPath,k} \otimes W_{rxCal,k}$ into their random constructs, and with these noise and interference redefinitions the received data matrix model further simplifies to the form $$X_k = [s_k a_{calSwitch}^T] \otimes G_k \otimes W_k + \sum_{i=1}^{N_i} v_{i,k} a_{i,k}^T + N_k \qquad (7)$$

where we have adopted the simplified notation $$G_{rxPath,k} \to G_k = [g_{1,k} g_{2,k} \cdots g_{N_{ants},k}] \qquad (8)$$

$$W_{rxPath,k} \to W_k = [w_{1,k} w_{2,k} \cdots w_{N_{ants},k}]. \qquad (9)$$

The first stage of calibration processing is interference cancellation (414 in FIG. 4) in each of the $N_{cal}$ antennas undergoing the current calibration cycle, using samples of the interference provided by the cancellation group of $N_{canc}$ antennas. In this discussion the terms interference cancellation and interference reduction are considered synonymous, in that many factors (such as number of interferers, number of antenna elements, interference multipath severity, adaptation TBP, and adaptation criteria) weigh on the degree of interference reduction achieved. Interference cancellation is performed independently for each subband and each of the $N_{cal}$ antenna paths under calibration in the current cycle. An interference cancellation weight vector $u_{l,k}$ is generated on snapshot k for antenna path l under calibration as $$u_{l,k} = (X_{canc,k}^H X_{canc,k})^{-1} X_{canc,k}^H e_{l,k} \qquad (10)$$

where $X_{canc,k}$ is the ($N_{subcarriers} \times N_{canc}$) submatrix of $X_k$ containing the $N_{canc}$ columns corresponding to the antennas used for interference sampling, and $e_{l,k}$ is the interference-contaminated calibration residuals vector in path l $$e_{l,k} = x_{l,k} - s_k./w_{l,k} \qquad (11)$$

where "./" denotes element-by-element (e.g., Hadamard) division, and where $w_{l,k}$ is the latest subband equalization vector (calibration weights) for path l, as defined in (9).

The interference cancellation weight vector $u_{l,k}$ in (10) is an example using a least-squares (LS) criterion for reducing the interference present in antenna path l. An LS canceller weight vector $u_{l,k}$ is generally composed of an inverse covariance matrix $(X_{canc,k}^H X_{canc,k})^{-1}$ of multiple-antenna data containing interference, multiplied by a cross-correlation vector $X_{canc,k}^H x_{l,k}$ of the multiple-antenna data with the data stream $x_{l,k}$ which is the subject of interference removal (e.g., the path under calibration). However, in the current calibration application, knowledge of the calibration waveform $s_k$ and the latest calibration weights $w_l,k$ may be applied to the cross-correlation calculation to achieve a deeper interference cancellation solution. This may be done by subtracting the known calibration waveform (as predistorted by the reciprocal of $w_{l,k}$ to match the latest estimate of front-end distortion) from $x_{l,k}$, thereby better exposing the interference in the path under calibration by removing the bulk of the calibration signal that is "interfering" with that interference. Such a subtraction yields a calibration residuals vector ($e_{l,k}$ in eqn. 11) that may be used in lieu of $x_{l,k}$ to produce a more accurate interference cross-correlation vector (as $X_{canc,k}^H e_{l,k}$ in lieu of $X_{canc,k}^H x_{l,k}$) for use in the LS copy weights solution (10). An interference-cancelled received calibration sounding vector for snapshot k on path l is then given by $$r_{l,k} = x_{l,k} - X_{canc,k} u_{l,k}. \quad (12)$$

If more than one OFDM symbol is used in order to meet the $4N_{canc}$ TBP training rule, equations (10) and (11) may be modified to utilize duly abutted data matrices $X_{canc,k}$ and vectors $x_{l,k}$, each containing of $MN_{subcarriers}$ rows, and an equivalent concatenation of multiple calibration sequence vectors $s_k$, incorporating the M consecutive OFDM symbols used to generate the canceller weights $u_{l,k}$ in the processed subband. Because this concatenation is utilized only for the interference cancellation, the M associated calibration snapshots will use this same vector $u_l$, in (12). Subsequent processing to estimate and remove the antenna path frequency response may be performed as usual on an OFDM symbol-by-symbol basis, in which case each OFDM symbol (post interference cancellation) may be treated as an independent calibration snapshot k.

The interference-cancelled received sounding data then enters calibration update processing 418 in FIG. 4, where it is demodulated to remove the subband calibration sequence $s_k$, yielding the instantaneous (snapshot-k) estimate of the path l subband frequency response as $$z_{l,k} = \frac{r_{l,k} \otimes s_k^*}{|s|^2}. \quad (13)$$

In (13) the use of a constant modulus sequence for $s_k$ allows the demodulation to be accomplished by element-wise multiplication with its conjugate rather than more computationally costly element-wise division by $s_k$ that would otherwise be required. Each such $z_{l,k}$ sequence is smoothed over multiple snapshots to enhance the SNR of a running estimate A of antenna path frequency response $g_{l,k}$ in (8), as $$\hat{g}_{l,k} = \langle z_{l,k} \rangle_k \quad (14)$$

where the angle bracket notation $\langle z_{l,k} \rangle_k$ signifies vector averaging or smoothing of unspecified type over argument k. Numerous averaging methods are applicable, such as sliding windowed averaging over the past K snapshots, non-windowed (e.g., boxcar) averaging, exponential averaging, or other finite impulse-response (FIR) or infinite impulse-response (IR) methods. For example, exponential IIR averaging may be accomplished by computing $$\hat{g}_{l,k} = \alpha \hat{g}_{l,k-1} + (1-\alpha) z_{l,k} \quad (15)$$

where $$\alpha = \frac{K-1}{K+1} \quad (16)$$

is an averaging constant to achieve an effective averaging over (nominally) K snapshots. After each update, the corresponding subband calibration weights for antenna path l are computed as the element-by-element reciprocal $$w_{l,k} = 1/\hat{g}_{l,k}. \quad (17)$$

As each such $w_{l,k}$ becomes available, it is substituted into $W_k$ in (9).

A prescreening may be applied to prevent entry of interference-contaminated instantaneous frequency response vectors $z_{l,k}$ into multiple-snapshot smoothing (14) as performed for example by (15). Interference contamination may occur as a result of interference cancellation failures in (12) due for example to interference overload ($N_i \geq N_{canc}$), which may occur if too many interferers are present and/or if interferers are received in heavy multipath conditions, or due to other causes such as, but not limited to, extremely high interference amplitudes. To this end, a quality metric $Q_{l,k}$ may be defined in dB for each snapshot of each antenna path l as $$Q_{l,k} = 10 \log_{10}(q_{l,k}^H q_{l,k}) \quad (18)$$

where $$q_{l,k} = \tilde{z}_{l,k} - 1_{N_{subcarriers} \times 1}. \quad (19)$$

and $$\tilde{z}_{l,k} = z_{l,k} \otimes w_{l,k}. \quad (20)$$

This example quality metric $Q_{l,k}$ serves as a spectral flatness (e.g., "whiteness") metric for the calibrated antenna path, or more precisely as a "oneness" metric, in that it measures the normalized mean-squared deviation of $\tilde{z}_{l,k}$ from an all-ones vector, which perfect calibration would yield for this equalized instantaneous frequency response vector in the mean (e.g., if observed in interference-free and noise-free conditions). Smaller values of $Q_{l,k}$ (e.g., large negative values in dB) indicate improving quality. Accordingly, a threshold decision function $d_{l,k}$ may be implemented using $Q_{l,k}$ as follows:

$$d_{l,k} = \begin{cases} \text{Include In Smoothing:} & Q_{l,k} \leq \gamma \\ \text{Exclude From Smoothing:} & Q_{l,k} > \gamma \end{cases} \quad (21)$$

where $\gamma$ is a decision threshold in dB. During snapshots yielding an "Exclude From Smoothing" decision, the last available updated value of $\hat{g}_{l,k}$ from (14) and corresponding equalization vector $w_{l,k}$ from (17) may continue to be used for equalization purposes. Because the calibration signal may be injected at a significant SNR as part of a proper system design, threshold $\gamma$ may be set to on the order of $-10$ dB or lower initially, then dropping to lower values on the order of $-SNR$ (dB), plus a margin, after initial convergence. A governing principal for threshold strategies is that normalized mean-squared error in decibels is approximately equal to $-SNR$ (dB) if the latter is greater than 10 dB, with closer correspondence as the SNR increases beyond that point.

The example quality metric in (18) is only one example of a possible quality metric. For example, a simpler quality metric calculation may be constructed by testing just the modulus values of $\tilde{z}_{l,k}$ in (20), by calculating the standard deviation, or alternatively the variance, of the element-wise complex amplitudes of $\tilde{z}_{l,k}$. As before, the decision rule would draw an "Exclude From Smoothing" decision based on either of the latter calculated statistics exceeding a threshold that would be derived from the calibration signal SNR.

In addition to the snapshot averaging indicated in (14), the $\hat{g}_{l,k}$ may also be averaged in frequency, e.g., across subcarriers, in which case an FIR smoother such as a sliding window or boxcar averaging may be more appropriate than IIR averaging, as the latter contains start-up transients that may degrade performance at band edges. As well, an FIR smoother may work best if extra subcarriers are included and sounded for FIR start-up at both subband edges, equal in number to one-half the width in subcarriers of the sliding window. The averaging provided by such an approach would increase noise reduction, hence calibration SNR, at the cost of reduced frequency agility, a strategy that may benefit systems needing rapid calibration updates. The averaging window may be chosen to achieve a needed compromise between calibration SNR enhancement and resultant time-agility, versus frequency agility. This trade-off may include the full range of possibilities extending from no averaging (e.g., single-subcarrier frequency resolution) to full-subband averaging, as needed.

An alternative frequency averaging approach may be to perform FIR smoothing across the subcarriers spanning the merged, wideband calibration weights array $W_k$ 428. This alternative provides both SNR enhancement, as before, but also smoothing across subband boundaries of any subband discontinuities that may be present. Such a smoothed characteristic would be more typical of actual RF and analog component frequency responses. However, caution should be exercised to avoid sacrificing operational merit for cosmetic reasons. For example, in OFDM systems that make subband-based frequency allocations, it may be preferable to favor a more localized subband calibration than to incorporate adjacent subband distortions that do not actually impact the assigned OFDM user or link.

A non-limiting example of parameters that may be used with the described method is as follows $N_{ants}=8$ (22a)

$N_{cal}=2$ (22b)

$N_{canc}=6$ (22c)

$N_{subcarriers}=52$ (22d)

$M=1$ (22e)

where (22e) indicates that a single OFDM symbol is adequate for all processing given the 8-antenna array (e.g., according to the $4N_{canc}$ rule). Similarly, doubling the number of antennas on the array to $N_{ants}=16$ may be handled by resetting (22e) to M=2 and leaving all other parameters unchanged.

Figure 5:
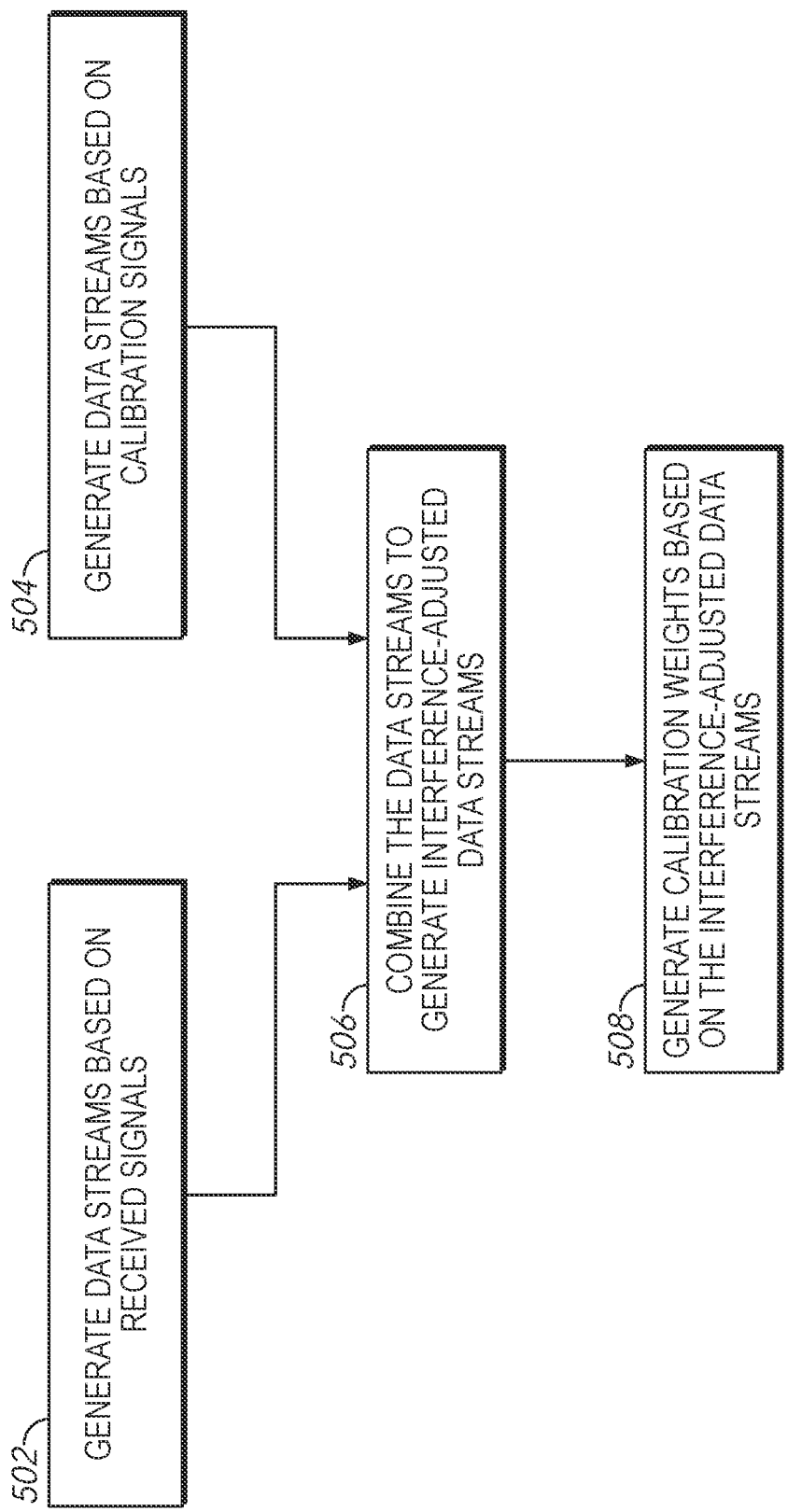
FIG. 5 is a flowchart of a method arranged in accordance with examples described herein.

FIG. 5 is a flowchart of a method arranged in accordance with examples described herein. The method of FIG. 5 includes block 502, "generate data streams based on received signals." The method of FIG. 5 includes block 504, "generate data streams based on calibration signals." Block 502 and 504 may occur in parallel and/or at least partially in parallel. In some examples, however, blocks 502 and 504 may occur serially (e.g., one after the other). The method of FIG. 5 continues with block 506 "combine the data streams to generate interference-adjusted data streams." Block 506 may be followed by block 508 "generate calibration weights based on the interference-adjusted data streams." Additional, fewer, and/or different blocks may be used in other examples.

Block 502 recites "generate data streams based on received signals." For example, a number of frequency domain data streams may be generated by sampling signals received at a corresponding number of data paths associated with antennas of an antenna array. By data path is meant an antenna path plus digitizer and specified follow-on digital processing (such as an FFT) during receiver calibration operations. When discussing receiver calibration, antenna path and data path may be used interchangeably. Referring back to FIG. 4, for example, a number of such data paths may be provided—for example, one data path may be present between each of the antennas of the antenna array 402 and an output of the OFDM FFT bank 407. The signals provided on the $N_{canc}$ data paths (e.g., from the $N_{canc}$ antennas) may be the data streams generated in block 502. The data streams may correspond to signals received at certain ones of the antennas of the antenna array 402 (e.g., $N_{canc}$ antennas). Accordingly, the signals received at the $N_{canc}$ antennas may be sampled and processed by the analog electronics 406 and FFT bank 408 to provide the data streams of block 502 of FIG. 5. Note that the data paths used to generate the data streams in block 502 may be associated with data paths which are not coupled to the receiver calibration source 405 (e.g., data paths for which the calibration switch 404 is open). The signals received at the $N_{canc}$ antennas may be interfering signals. In this manner, the data streams generated in block 502 may be data streams representing interference. Calibration signals described herein may be used to calibrate a receiver to adjust an amplitude and/or phase of received signals to compensate for variations introduced by analog front-end electronics. The calibration signals may be adjusted based on these data streams representative of interference. In that manner, interference-adjusted calibration signals may be provided that can be used to compensate for variations introduced by receiver analog front-end electronics and/or other electronics in a data path in the presence of interference.

Block 504 recites "generate data streams based on calibration signals." For example, a number of frequency domain data streams may be generated by applying calibration signals to a number of data paths associated with a number of antennas in an antenna array. Referring to FIG. 4, for example, the data streams of block 504 may be generated at the $N_{cal}$ data paths. A receiver calibration source may be coupled with the $N_{cal}$ antenna's data paths using the calibration switch 404. The data streams of block 504 may be provided as the calibration source signals are provided to and processed by the analog front-end electronics 406 and OFDM FFT bank 407. In this manner, the set of data streams generated in block 504 represent a set of known input signals (e.g., calibration signals) modified by the data path electronics (e.g., the analog front-end electronics). Each of the calibration antenna paths may accordingly be injected on a recurring periodic or non-periodic basis with a calibration signal (e.g., an OFDM calibration sequence). The same calibration signal (e.g., sequence) may be used in all receiver calibration antenna paths in some examples, although different calibration signals may be used on particular paths in some examples.

As described herein, these data streams may allow for the data path electronics-induced modifications to be identified and/or cancelled and/or reduced in other data streams. Further, these data streams may be combined with the interference-related data streams to provide interference-adjusted calibration signals which allow for calibration not only to reduce amplitude and/or phase variation introduced by data path electronics, but also to reduce those variations in the presence of interference.

Note that in the example of FIG. 4, the front end electronics 406 is depicted as a single block, however front end electronics 406 may refer to a variety of components (e.g., circuit components, circuit board traces, cabling, wiring) that may form data paths between the antenna array 402 and a downstream portion of a receiver. For example, front end electronics 406 may include a number of components forming data paths for the Ncal antennas and a number of components forming data paths for the $N_{canc}$ antennas.

In block 506, data streams of block 504 and 502 may be combined to generate interference-adjusted data streams. The combining may be performed, for example, using one or more processors (e.g., a digital signal processor (DSP), application specific integrated circuit (ASIC), central processing unit (CPU), and/or other software or firmware processing circuitry). Interference-adjusted calibration waveforms may be generated by combining the data streams based on receipt of incident signals on certain antennas in an antenna array and data streams based on calibration signals provided on other data paths associated with other antennas in the antenna array. Referring back to FIG. 4, the data streams provided by the $N_{canc}$ data paths (e.g., which represent received interference) may be subtracted from the data streams provided by the $N_{cal}$ data paths (e.g., which represent received calibration signals). In some examples, the data streams based on interference signals (e.g., $N_{canc}$) may be weighted in accordance with cancellation weights in addition to and/or instead of being subtracted from the $N_{cal}$ data paths. Multiplication with cancellation weights may provide a representation of interference. Subtracting the representation of interference from the data streams generated based on the calibration signals (e.g., the $N_{cal}$ data streams) may generate interference-adjusted calibration signals.

The cancellation weights may be calculated based on a matrix of data from the antenna paths receiving interfering signals (e.g., the $N_{canc}$ paths) and data from the antenna paths receiving calibration signals (e.g., the $N_{cal}$ paths). The calculation may be performed using one or more processors (e.g., one or more DSP processors, ASICs, CPUs, and/or other software or firmware processing circuitry). In some examples, the cancellation weights may be calculated based on calibration residuals from the data paths receiving calibration signals. Calibration residuals may refer to the data streams from the calibration data paths with the known calibration signal removed (e.g., after applying the current inverse calibration weights to the calibration signal to align it with the identified system gain and phase errors in the calibration antenna paths). In some examples, cancellation weights may be updated on each calibration snapshot. While the cancellation weights may be updated on each snapshot, the update may incorporate data from more than one snapshot (e.g., including a previous one or more snapshots).

Note that the cancellation weights may be updated using calibration residuals in some examples. However, the cancellation weights generated as described herein may be used to cancel interference from the calibration data stream (e.g., not the residuals) in some examples. This may achieve a deeper interference cancellation in some examples. However, in some examples the cancellation weights may be updated based on the calibration data streams themselves (e.g., not the residuals).

Using calibration residuals generally refers to using $e_{l,k}$ in (Equation 11) where the (un)equalized calibration signal $s_k/w_{l,k}$ has been subtracted from the data of the antenna path under calibration $x_{l,k}$, to compute the canceller weights $u_{l,k}$ in (Equation 10). If the $s_k$ subtraction was not performed first, the interference canceller may be less effective in some examples, because the interference may be masked by the calibration signal $s_k$. However, in some examples, calibration signal subtraction may not be used, and cancellation weights may be updated based on the calibration signal data (not residuals).

As described herein, the number of antenna paths used to receive interfering signals (e.g., Now) may be selected based on an expected number of interferers in the system in which a receiver is located. For example, the expected number of interferers may refer to an expected number of other transmitters in the environment of the receiver.

In this manner, data streams from a subset of antennas of an antenna array may be used to cancel interference from another subset of the antennas during receiver calibration time-intervals (e.g., calibration snapshots). The calibration and cancellation antennas are non-overlapping in a particular time interval.

In block 508, calibration weights may be generated using the interference-adjusted calibration waveforms provided in block 506. The calibration weights may be generated using one or more processors (e.g., one or more DSP processors, ASICs, CPUs, and/or other software or firmware processing circuitry). Any of a variety of calibration techniques may be used to generate the calibration weights. Typically, the calibration weights may allow for a calculation of per-snapshot gain and/or phase variations versus frequency based on the interference-cancelled antenna path calibration data streams. Generally, ongoing receiver calibration snapshots may be obtained over which averaging is performed to yield a running estimate of the gain and phase variations in each antenna path of the receiver front-end. Note that generally one instantaneous estimate may be generated per snapshot, although multiple snapshots of data may be used to generate the single instantaneous estimate. A calibration snapshot may refer to the interference-adjusted calibration waveforms from a particular time period.

In some examples, multiple snapshots of interference-adjusted calibration waveforms may be generated using multiple instances of combining the calibration data streams with the interference data streams. For example, each snapshot may be from a different time (e.g., consecutive time slots and/or spaced apart time slots). Calibration weights may be calculated for each snapshot. A set of final calibration weights may be calculated by combining the per-snapshot calibration weights—such as by smoothing (e.g., averaging) two or more of the per-snapshot calibration weights. Any of a variety of smoothing techniques may be used including a sliding window average smoother—for example, multiple consecutive and/or spaced snapshots may be averaged to generate final calibration weights. Another example of a smoothing technique is an exponential smoother where individual per-snapshot weights may be weighted in accordance with a distance from the present snapshot, which may be accomplished by weighting a previous average of such calibration weights by an exponential forgetting factor and summing it with an appropriately weighted version of the present snapshot weights. Other finite impulse response (FIR) and/or infinite impulse response (IIR) smoothers may be used in some examples. In some examples, a set number of per-snapshot calibration weights may be combined (e.g., averaged) to arrive at a final set of weights. In some examples, certain snapshots are selected for inclusion in the smoothing based on a quality metric. For example, snapshots containing less reliable data or greater than a threshold deviation from an average may not be used in calculating a final set of calibration weights. Any of a variety of include/exclude functions may be used to identify the snapshots used in calculating the final set of calibration weights—e.g., to determine whether a particular snapshot instantaneous gain and phase vector is included in a smoothing operation. In some examples, the decision may be based on an instantaneous vector quality metric, e.g., how closely the equalized instantaneous (per-snapshot) calibration data matches a known calibration waveform (e.g., $s_k$). In some examples, the quality metric may be standard deviation, variance, normalized mean-squared error, and/or SNR or SINR estimate of instantaneous vector quality versus known a calibration waveform.

Cancellation and calibration weights may be generated per-subband. For example, a set of calibration weights may be calculated using interference-adjusted calibration waveforms from a particular subband, while another set of calibration weights may be calculated using interference-adjusted calibration waveforms from another subband. In some examples, calibration weights may be calculated based on the interference-adjusted calibration waveforms by smoothing (e.g., averaging) the calibration weights over multiple frequency bins (e.g., multiple subbands). For example, multiple sets of interference-adjusted calibration waveforms may be generated for multiple subbands. Final calibration weights may be generated by smoothing (e.g., averaging) the calibration weights over the multiple subbands. Any of a variety of smoothing functions may be used including, for example, a sliding window average smoother, exponential smoother, and/or other FIR or IIR smoothers.

The calibration weights may be used by one or more receivers to receive (e.g., decode) wireless signals. For example, referring to the example of FIG. 4, during operation, wireless signals may be incident on the antenna array 402, may be processed by the front-end electronics 406 and the OFDM FFT bank 407, and may be processed using the weights $W_k$ to decode the incident signals in a manner that wholly and/or partially compensates for variations imposed by the front-end electronics in the presence of interference. If calculated separately, different calibration weights may be used per antenna path and/or per subband.

For example, during operation, the calibration switch 404 may be opened (e.g., "off") such that the calibration source 405 is not applied to the $N_{cal}$ antenna paths. Wireless signals may be received at the $N_{cal}$ antenna paths (and also the Nan antenna paths) and may be decoded using the calibration weights. Use of the calibration weights allows for removal of phase and/or amplitude variations due to one or more components in the antenna path (e.g., the front end electronics 406).

The method of FIG. 5 may be used to generate calibration weights for particular antenna paths (e.g., associated with certain antennas). The calibration weights are calculated for the $N_{cal}$ antenna paths having the calibration signal applied. The method of FIG. 5 may be repeated with the calibration signal applied to other antenna paths to generate calibration weights for use with those antenna paths. For example, a top group of $N_{cal}$ antenna paths are shown in FIG. 4, while a bottom group of $N_{canc}$ paths are also shown. The calibration switch 404 is depicted as "on" (e.g., closed) for the connection to the $N_{cal}$ calibration data paths and "off" (e.g., open) for the connection to $N_{canc}$ cancellation data paths. The method of FIG. 5 may be repeated with the calibration switch 404 in a different configuration (e.g., open for the top $N_{cal}$ antenna paths and closed for the bottom $N_{canc}$ antenna paths). In this manner, calibration weights may be calculated for use with the $N_{canc}$ antenna paths previously used for interference cancellation.

Accordingly, a calibration signal may be applied to a different set of antenna paths, and interference-adjusted calibration waveforms may be generated for that different set of antenna paths and used to generate calibration weights.

Examples of systems, receivers, and methods are described herein that may advantageously provide calibration that may include interference cancellation. Generally, two-stage calibration has been described. Interference cancellation may be performed followed by calibration using calibration data which has been wholly and/or partially adjusted to reduce the impact of interference.

What is claimed is:

1. A method comprising:
applying at least one calibration signal to at least one of a plurality of antenna paths at a location prior to at least one respective analog front-end electronic component of the at least one of the plurality of antenna paths and after at least one respective antenna of the at least one of the plurality of antenna paths;
generating interference-adjusted calibration waveforms based on combining a first plurality of frequency domain data streams generated using sampling signals with at least one second frequency domain data stream generated using the at least one calibration signal;
generating calibration weights based on the generated interference-adjusted calibration waveforms; and
combining further frequency domain data streams received at the plurality of antenna paths with the calibration weights to reduce variations introduced by the at least one respective analog front-end electronic component of the at least one of the plurality of antenna paths, wherein the variations comprise phase variations, amplitude variations, or combinations thereof.

2. The method of claim 1, wherein the plurality of antenna paths are a first plurality of antenna paths utilizing at least a first plurality of antennas of an antenna array, and the first plurality of frequency domain data streams are generated based on the sampling signals received at a second plurality of antenna paths by a second plurality of antennas of the antenna array.

3. The method of claim 2, wherein the first plurality of frequency domain data streams are based on sampling interference signals received at the second plurality of antenna paths.

4. The method of claim 3, wherein a count of the second plurality of antennas is based on an expected number of interference sources.

5. The method of claim 2, wherein the first plurality of antenna paths and the second plurality of antenna paths comprise respective analog front-end electronic components.

6. The method of claim 2, wherein the calibration weights are for use with the first plurality of antenna paths, the method further comprising:
generating interference-adjusted calibration waveforms for the second plurality of antenna paths based at least in part on applying the at least one calibration signal to the the second plurality of antenna paths; and
generating calibration weights for use with the second plurality of antenna paths based on the interference-adjusted calibration waveforms for the second plurality of antenna paths.

7. The method of claim 1, wherein the interference-adjusted calibration waveforms are for a subband of the at least one second frequency domain data stream, and wherein the method further comprising generating further interference-adjusted calibration waveforms for other subbands of the at least one second frequency domain data streams.

8. The method of claim 1, wherein combining the at least one second frequency domain data streams with the first plurality of frequency domain data streams comprises weighting the first plurality of frequency domain data streams in accordance with cancellation weights to provide a representation of interference.

9. The method of claim 8, further comprising subtracting the representation of interference from the at least one second frequency domain data streams to provide the interference-adjusted calibration waveforms.

10. The method of claim 8, further comprising calculating the cancellation weights based on a matrix of data from a first plurality of antenna paths and data from a second plurality of antenna paths.

11. The method of claim 10, further comprising calculating the cancellation weights based on calibration residuals from the first plurality of antenna paths.

12. The method of claim 1, further comprising generating multiple snapshots of the interference-adjusted calibration waveforms based on multiple instances of combining the at least one second frequency domain data streams with the first plurality of frequency domain data streams, wherein the generation of the calibration weights based on the interference-adjusted calibration waveforms comprises smoothing the calibration weights over the multiple snapshots.

13. The method of claim 12, further comprising selecting certain snapshots for inclusion in the smoothing based on a quality metric.

14. The method of claim 1, wherein generating calibration weights based on the interference-adjusted calibration waveforms further comprises smoothing the calibration weights over multiple frequency bins.

15. The method of claim 14, further comprising generating sets of interference-adjusted calibration waveforms for multiple subbands, wherein generating the calibration weights based on the interference-adjusted calibration waveforms comprises smoothing the calibration weights over the multiple subbands.

16. A receiver comprising:
a plurality of antenna paths with respective antennas and respective electronic components:
a calibration source configured to apply at least one calibration signal to at least one of the plurality of antenna paths at a location prior to at least one respective electronic component of the at least one of the plurality of antenna paths and after at least one respective antenna of the at least one of the plurality of antenna paths; and
a processor configured to:
combine data streams from an interference subset of respective antenna paths generated using sampling signals with at least one data stream from a calibration subset of the respective antenna paths generated using the at least one calibration signal applied to the calibration subset of the respective antenna paths to generate interference-cancelled calibration waveforms; and
generate calibration weights based on the interference-cancelled calibration waveforms; and
combine further data streams from the calibration subset of the respective antenna paths with the calibration weights to reduce variations introduced by at least one re v electronic component provided in the at least one of the respective antenna paths, wherein the variations comprise phase variations, amplitude variations, or a combination thereof.

17. The receiver of claim 16, further comprising:
a calibration switch configured to couple the calibration source to the calibration subset of the respective antenna paths.

18. The receiver of claim 17, wherein the processor is further configured to generate cancellation weights, and wherein the processor is configured to combine the data streams at least in part by weighting the data streams from the interference subset of the respective antenna paths with the cancellation weights.

19. The receiver of claim 18, wherein the processor is further configured to subtract the weighted data streams from the at least one data stream from the calibration subset of the respective data paths.

20. The receiver of claim 16, wherein a count of the interference subset of the respective antenna paths is based on an expected count of interferers in a communication system including the receiver.

21. The receiver of claim 16, wherein the processor is configured to calculate per-snapshot calibration weights, and calculate the calibration weights by smoothing the per-snapshot calibration weights.

* * * * *